United States Patent
Verhagen et al.

(10) Patent No.: US 9,631,986 B2
(45) Date of Patent: Apr. 25, 2017

(54) ROTATABLE TEMPERATURE SENSING DEVICE

(71) Applicant: Illinois Tool Works Inc., Glenview, IL (US)

(72) Inventors: Paul David Verhagen, Appleton, WI (US); Jyi-Jiin Luo, Morton Grove, IL (US); Michael C. Dill, Elk Grove Village, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 354 days.

(21) Appl. No.: 14/258,961

(22) Filed: Apr. 22, 2014

(65) Prior Publication Data

US 2014/0334516 A1 Nov. 13, 2014

Related U.S. Application Data

(60) Provisional application No. 61/822,013, filed on May 10, 2013.

(51) Int. Cl.
*G01K 13/08* (2006.01)
*G01K 1/14* (2006.01)

(52) U.S. Cl.
CPC ............. *G01K 13/08* (2013.01); *G01K 1/143* (2013.01)

(58) Field of Classification Search
CPC ............................... G01K 13/06; G01K 13/08
USPC ................................................. 374/153–154
See application file for complete search history.

(56) References Cited

U.S. PATENT DOCUMENTS

| | | | | |
|---|---|---|---|---|
| 2,322,501 A | * | 6/1943 | Barnitz .................. | B23K 1/001 136/232 |
| 2,618,672 A | * | 11/1952 | Cizmadia ............... | G01K 13/06 136/229 |
| 2,947,171 A | * | 8/1960 | Peltola .................. | G01K 13/04 219/458.1 |
| 3,290,943 A | * | 12/1966 | Li .......................... | G01K 13/06 374/154 |
| 3,731,536 A | * | 5/1973 | Baumann ............... | G01K 13/06 136/221 |

(Continued)

FOREIGN PATENT DOCUMENTS

CN 102221423 10/2011
GB 1431177 4/1976

OTHER PUBLICATIONS

International Search Report for PCT application No. PCT/US2014/036162, dated Dec. 1, 2014, 9 pgs.

(Continued)

*Primary Examiner* — Minh Phan
*Assistant Examiner* — Leon W Rhodes, Jr.
(74) *Attorney, Agent, or Firm* — Fletcher Yoder P.C.

(57) ABSTRACT

A rotatable temperature sensing device. In one example, a temperature sensing device includes a first end. The temperature sensing device also includes a second end. The temperature sensing device includes a shaft coupling the first end and the second end. The shaft is configured to rotate the first and second ends together during operation. The temperature sensing device also includes a temperature sensor disposed in the first end and configured to communicatively connect to an external device, wherein the temperature sensor is configured to provide an indication of a temperature of the workpiece.

16 Claims, 2 Drawing Sheets

(56) References Cited

U.S. PATENT DOCUMENTS

| | | | | |
|---|---|---|---|---|
| 3,970,910 | A | * | 7/1976 | Schindler .................. G05D 3/14 |
| | | | | 219/124.34 |
| 4,419,023 | A | | 12/1983 | Hager |
| 4,708,495 | A | * | 11/1987 | Kitzinger ............... G01K 1/024 |
| | | | | 219/469 |
| 5,159,166 | A | | 10/1992 | Arnosti |
| 5,544,953 | A | * | 8/1996 | Viertl ....................... G01B 7/06 |
| | | | | 136/230 |
| 8,192,075 | B2 | * | 6/2012 | Desai ................... G01N 29/326 |
| | | | | 374/117 |
| 2007/0217480 | A1 | | 9/2007 | Lai |

OTHER PUBLICATIONS

Kang, Xiaoliang, "Friction Stir Welding Temperature Field Experimental Research of Experimental Research of Aluminum Alloy," Chinese Master's Theses Full-Text Database Engineering Science and Technology I, vol. I, No. 2, May 26, 2012, pp. 1-75.

* cited by examiner

ROTATABLE TEMPERATURE SENSING DEVICE

This application is a Non-provisional patent application of U.S. Provisional Patent Application No. 61/822,013, entitled "ROTATABLE TEMPERATURE SENSING DEVICE", filed May 10, 2013, which is incorporated herein by reference in its entirety.

BACKGROUND

The invention relates generally to temperature sensors and, more particularly, to a rotatable temperature sensing device that may be used during a welding operation.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

Welding operations are performed on a variety of different materials (e.g., metallic materials). For example, a workpiece may be formed from a carbon steel or a corrosion resistant alloy, such as stainless steel. A time duration of heat that the workpiece is exposed to may be managed for obtaining certain metallurgical characteristics. Accordingly, a quality of a welding operation on a workpiece may depend on a time history of temperatures that the workpiece is exposed to during the welding operation. Unfortunately, it may be difficult to detect the temperature of a workpiece near a joint while a welding operation is occurring on the joint. Thus, it may be difficult to determine a time history of temperatures that a workpiece is exposed to during the welding operation. Furthermore, the workpiece may rotate during the welding process, making it more difficult to determine temperatures (e.g., due to errors in measurement, wear on a device contacting the workpiece, etc.). Moreover, the workpiece may be in motion relative to a temperature measurement device during the welding process.

BRIEF DESCRIPTION

In one embodiment, a temperature sensing device includes a first end. The temperature sensing device also includes a second end. The temperature sensing device includes a shaft coupling the first end and the second end. The shaft is configured to rotate the first and second ends together during operation. The temperature sensing device also includes a temperature sensor disposed in the first end and configured to communicatively connect to an external device, wherein the temperature sensor is configured to provide an indication of a temperature of the workpiece.

In another embodiment, a temperature sensing device includes a rotatable tip having a temperature sensor. The temperature sensing device also includes a stationary shaft electrically coupled to the temperature sensor of the rotatable tip. The rotatable tip is configured to rotate relative to the stationary shaft while contacting a moving workpiece.

In a further embodiment, a temperature sensing device includes a rotatable tip, wherein the rotatable tip is configured to contact a workpiece. The rotatable tip is formed from an insulating material. The temperature sensing device also includes a thermally conductive layer coupled to the insulating material. The temperature sensing device includes a temperature sensor configured to detect a temperature of the thermally conductive layer. The temperature sensor is configured to communicatively couple to an external device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
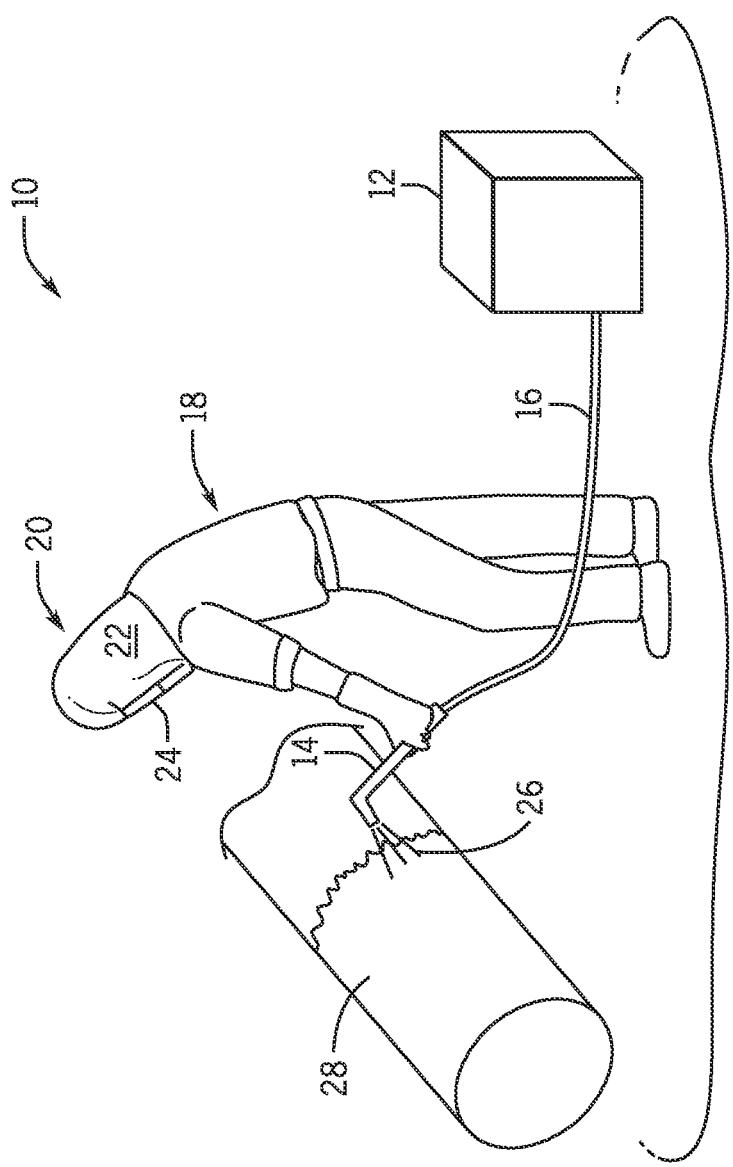
FIG. 1 is an illustration of an embodiment of a welding system including a workpiece that may be formed from a carbon steel or a corrosion resistant alloy, in accordance with aspects of the present disclosure.

Embodiments of the present invention may be used in any application where one or more temperatures may be detected. For example, FIG. 1 illustrates an arc welding system 10. As depicted, the arc welding system 10 may include a power supply 12 that generates and supplies welding power to an electrode 14 via a conduit 16. In the arc welding system 10, a direct current (DC) or alternating current (AC) may be used along with the consumable or non-consumable electrode 14 to deliver current to the point of welding. In such a welding system 10, an operator 18 may control the location and operation of the electrode 14 by positioning the electrode 14 and triggering the starting and stopping of the current flow. As illustrated, a helmet assembly 20 is worn by the welding operator 18. The helmet assembly 20 includes a helmet shell 22 and a lens assembly 24 that may be darkened to prevent or limit exposure to the light generated by a welding arc 26.

When the operator 18 begins the welding operation (or other operation such as plasma cutting) by applying power from the power supply 12 to the electrode 14, the welding arc 26 is developed between the electrode 14 and a workpiece 28, such as the illustrated pipe. The workpiece 28 may be formed from a carbon steel or a corrosion resistant alloy, such as stainless steel, or other metals and alloys (e.g., aluminum, titanium, zirconium, niobium, tantalum, nickel alloys). Non-metal workpieces 28 may also be welded or otherwise joined, for example, by stir welding. The electrode 14 and the conduit 16 thus deliver current and voltage sufficient to create the welding arc 26 between the electrode 14 and the work piece 28. The welding arc 26 melts the metal (the base material and any filler material added) at the point of welding between the electrode 14 and the work piece 28, thereby providing a joint when the metal cools. The welding system 10 may be configured to form a weld joint by any suitable technique, including shielded metal arc welding (SMAW) (i.e., stick welding), gas tungsten arc welding (GTAW), gas metal arc welding (GMAW), flux-cored arc welding (FCAW), metal inert gas welding (MIG), tungsten inert gas welding (TIG), gas welding (e.g., oxyacetylene welding), sub-arc welding (SAW), and/or resistance welding. As may be appreciated, shielding gas may be used in certain applications, such as GTAW, GMAW, and FCAW, for example. Waveforms used during welding may include regulated metal deposition (RMD) type waveforms, among others, surface tension transfer (STT), cold metal transfer (CMT).

Generally, the techniques described herein enable certain operations (e.g., welding, cutting, grinding, induction heating, testing) to be performed on the workpiece 28 by applying power supplied by the power supply 12. The workpiece 28 may be disposed in an industrial facility (e.g., industrial plant, shipyard) but may also be disposed in a residential facility, such as a garage or a home. The workpiece 28 may include tubular pieces (e.g., pipe), flat sheeting (e.g., metal or plastic sheets and plates), angled workpieces 28 (e.g., angle iron) or any other piece that may be welded, cut, ground, induction heated, or tested, for example, by using power delivered via the power supply 12.

As described below, heat applied to the workpiece 28 may be detected (e.g., sensed) using a rotatable temperature sensing device. By using the rotatable temperature sensing device, temperatures of the workpiece 28 near a welding application may be detected and/or monitored to determine a quality of a welding operation and/or to control temperature of a welding operation being performed. As may be appreciated, such a rotatable temperature sensing device may be used in any application where temperature detection is desired, such as welding, cutting, grinding, induction heating, testing, and so forth.

Figure 2:
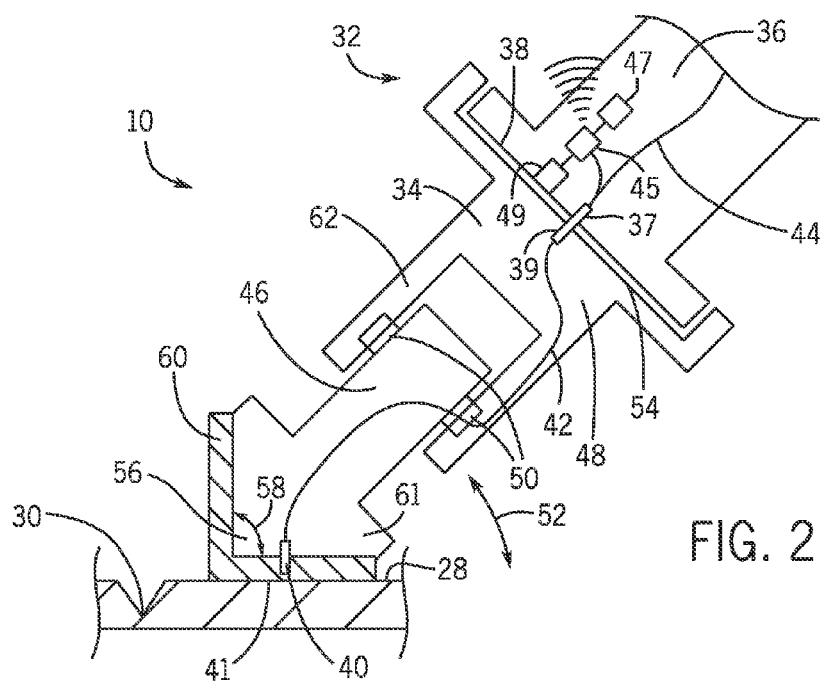
FIG. 2 is a cross-sectional view of an embodiment of a rotatable temperature sensing device, in accordance with aspects of the present disclosure.

FIG. 2 is a cross-sectional view of an embodiment of a rotatable temperature sensing device that may be included in the system 10. As illustrated, the workpiece 28 has a joint 30 where joining (e.g., welding) is to be performed. A rotatable temperature sensing device 32 is positioned adjacent to the joint 30 to detect one or more temperatures of the workpiece 28 before, during, and/or after the joint 30 is welded and/or to detect one or more temperatures of the workpiece 28 for any application, such as induction heating. For example, the rotatable temperature sensing device 32 may be positioned within one to four inches from the joint 30, in certain embodiments. The rotatable temperature sensing device 32 includes a rotatable tip 34 coupled to a stationary shaft 36. During operation of the rotatable temperature sensing device 32, an operator, or a stand, may hold the stationary shaft 36 in a position that enables the rotatable tip 34 to contact a surface (e.g., external surface, internal surface, etc.) of the workpiece 28. Thus, the rotatable tip 34 may rotate along the surface of the workpiece 28 as the workpiece 28 rotates, thereby maintaining contact with the surface to detect temperatures of the workpiece 28. Moreover, while the rotatable tip 34 rotates, the stationary shaft 36 does not rotate. In certain embodiments, the workpiece 28 may be substantially flat (e.g., a plate), or any other suitable shape. In such embodiments, the rotatable tip 34 may be configured to move relative to movement of the workpiece 28.

One or more slip rings 38 enable electrical connections between the rotatable tip 34 and the stationary shaft 36. That is, the slip ring(s) 38 may be an electromechanical device that enables the transmission of signals from a rotating structure to a stationary structure and vice versa. Using the one or more slip rings 38, temperature data may be communicated from the rotatable tip 34 to the stationary shaft 36. In certain embodiments, the rotatable tip 34 may include the one or more slip rings 38, and the stationary shaft 36 may include one or more electrical contacts (e.g., brushes, liquid metal, conductive plastic, etc.), such as a contact 37, to facilitate the electrical connection between the rotatable tip 34 and the stationary shaft 36. In other embodiments, the rotatable tip 34 may include one or more electrical contacts, such as a contact 39, and the stationary shaft 36 may include the one or more slip rings 38.

A temperature sensor 40 is disposed in the rotatable tip 34 and positioned adjacent to a surface 41 of the rotatable tip 34. Accordingly, the temperature sensor 40 may detect temperatures of the workpiece 28, such as while the rotatable tip 34 (e.g., the end with the temperature sensor 40) contacts the workpiece 28. The temperature sensor 40 may be any suitable devices that can provide indications that correspond to temperatures. The indication representative of a temperature of the workpiece 28 may include a signal, such as a voltage signal, a current signal, a wireless, signal, a magnetic signal and so on. The indication may additionally or alternatively be a data packet or packets, or other indications that may include numbers, text, or a combination thereof. For example, the temperature sensor 40 may be a thermocouple, a resistance temperature detector (RTD), and/or a thermistor. Temperature sensor leads 42 provide electrical connections between the temperature sensor 40 and the one or more slip rings 38. Furthermore, one or more wires 44 provide electrical connections between the one or more slip rings 38 and a temperature data receiving device or an external device, such as the power supply 12. The external device may then provide a visual and/or audio indication of the temperature of the workpiece 28. For example, a temperature reading may be provided via a display panel, via one or more lights (e.g., LEDs), via beeps, voice announcements, or a combination thereof. The external device may process signals or data transmitted by the sensor 40 and determine if the temperature is at a range suitable for operations on the workpiece 28, such as welding applications, cutting applications, grinding applications, induction heating applications, testing applications, and so forth. If the temperature is outside the desired range, the external device may warn the operator 18.

In one embodiment, the rotatable temperature sensing device 32 may include a wireless transmitter 45. The wireless transmitter 45 may be communicatively coupled to the temperature sensor 40 and may wirelessly transmit signals representative of the temperature. The wireless transmitter 45 may be powered by a battery 47 and/or a generator 49. In use, the generator 49 may take advantage of the rotating motion of the rotatable tip 34 and convert the rotation into electrical power for powering the wireless transmitter 45. Accordingly, the rotatable temperature sensing device 32 may be used as a standalone device without any external wiring. It is to be noted that while the figure depicts the wireless transmitter 45, battery 47, and generator 49 on the shaft 36, in other embodiments, the wireless transmitter 45, battery 47, and generator 49 may be disposed on the rotatable tip 34. In yet other embodiments, such as fault tolerant embodiments, wireless transmitters 45, batteries 47, and generators 49 may be disposed both in the rotatable tip 34 and in the shaft 36. The generator 49 may be a direct current (DC) generator, an alternating current (AC) generator, or any combination thereof.

The rotatable tip 34 includes a first portion 46 coupled to a second portion 48 using a retaining device 50. As illustrated, in certain embodiments, the first portion 46 may include a shaft concentrically disposed within an annular second portion 48. The first and second portions 46 and 48 may be manufactured using any suitable materials. For example, in certain embodiments, the first and second portions 46 and 48 may be manufactured using a metal, a metal alloy, a polymeric material, a ceramic material, and so forth.

A contact end 54 of the rotatable tip 34 includes the one or more slip rings 38 or one or more electrical contacts (e.g., one or more rotatable contacts), while a temperature sensing end 56 includes the temperature sensor 40. As illustrated, the temperature sensing end 56 has a conical shape to enable contact to be maintained with the workpiece 28 as the workpiece 28 rotates. In certain embodiments, the temperature sensing end 56 may be any suitable circular shape (e.g., conical, round, disc shaped, etc.). The temperature sensing end 56 may have any suitable cone angle 58. For example, the cone angle 58 may be within the range of approximately 60 to approximately 90 degrees, approximately 75 to approximately 105 degrees, or approximately 90 to approximately 120 degrees. In certain embodiments, the cone angle 58 may be approximately 90 degrees.

In the illustrated embodiment, the temperature sensing end 56 includes a thermally conductive layer 60 disposed over a substrate material 61. The conductive layer 60 may be dipped or sprayed onto the substrate material 61. The thermally conductive layer 60 may enable sufficient heat transfer between the surface of the workpiece 28 and the temperature sensing end 56 so that the temperature sensor 40 will detect an accurate temperature of the workpiece 28. In certain embodiments, the thermally conductive layer 60 may operate as a thermocouple. That is, contact between two dissimilar conductors, e.g., the conductive layer 60 and the sensor 40, or the conductive layer 60 and the surface 41, may result in an electric potential (e.g., voltage) signal correlative to temperature. Accordingly, changes in temperature may result in correlative changes to the signal.

As illustrated, the temperature sensor 40 is disposed in the thermally conductive layer 60. Thus, the temperature sensor 40 may detect temperatures of the thermally conductive layer 60 and/or the workpiece or another device contacting the thermally conductive layer 60. Furthermore, in certain embodiments, the substrate material 61 may be less thermally conductive than the thermally conductive layer 60 to reduce heat loss of the rotatable tip 34. For example, in certain embodiments, the thermally conductive layer 60 may be a metal or a metal alloy, while the substrate material 61 may be a ceramic material or a polymeric material. Moreover, in some embodiments, the thermally conductive layer 60 may be bonded to the substrate material 61, such as using an adhesive. As illustrated, a shaft 62 couples the contact end 54 to the temperature sensing end 56. The shaft 62 is configured to rotate the contact end 54 and the temperature sensing end 56 together during operation. As may be appreciated, by using the rotatable temperature sensing device 32, temperatures of the workpiece 28 may be detected and/or monitored. Accordingly, a quality of a welding operation on the joint 30 may be improved.

Figure 3:
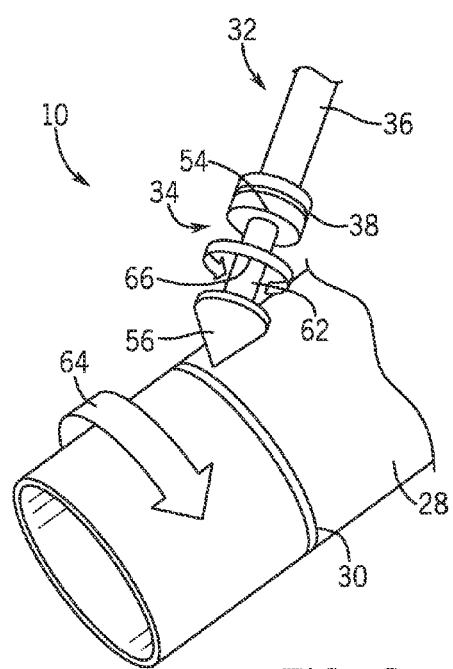
FIG. 3 is a perspective view of an embodiment of a rotatable temperature sensing device rotating in conjunction with a rotating pipe, in accordance with aspects of the present disclosure.

FIG. 3 is a perspective view of an embodiment of the rotatable temperature sensing device 32 rotating in conjunction with a rotating pipe. Because the figure includes like elements described in FIG. 2, the like elements are illustrated with like numbers. As illustrated, the workpiece 28 (e.g., a pipe) may rotate before, during, and/or after a welding or other operation is performed, as illustrated by arrow 64. Moreover, with the rotatable tip 34 contacting the workpiece 28, the rotatable tip 34 rotates as illustrated by arrow 66 while the workpiece 28 is rotating. Accordingly, temperatures of the workpiece 28 may be detected while the workpiece 28 is rotating. The rotatable tip 34 may be disposed during welding, for example, between one and four inches from the joint 30.

Figure 4:
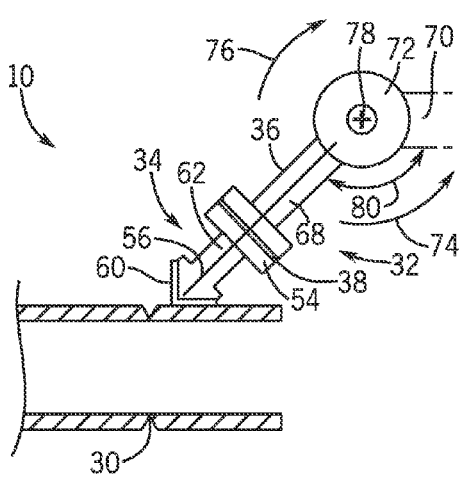
FIG. 4 is a cross-sectional view of an embodiment of a rotatable temperature sensing device having a pivot joint, in accordance with aspects of the present disclosure.

FIG. 4 is a cross-sectional view of an embodiment of the rotatable temperature sensing device 32 having a pivot joint. Because the figure includes like elements described in FIGS. 2 and 3, the like elements are illustrated with like numbers. As illustrated, the stationary shaft 36 includes a first stationary portion 68 and a second stationary portion 70. The first stationary portion 68 is coupled to the second stationary portion 70 by a pivot joint 72. The pivot joint 72 enables the first stationary portion 68 to be positioned relative to the second stationary portion 70 by facilitating relative movement in a clock-wise and/or counter clock-wise direction as illustrated by arrows 74 and 76.

A fastener 78 may hold the first and second stationary portions 68 and 70 together and/or may be tightened and/or loosened to adjust an angle 80 between the first and second stationary portions 68 and 70. By having the pivot joint 72 as part of the stationary shaft 36, an amount and/or a direction of force directed toward the rotatable tip 34 may be adjusted to enable contact of the rotatable tip 34 to be maintained with the workpiece 28. Furthermore, using the rotatable temperature sensing device 32, temperatures of the workpiece 28 may be detected and/or monitored. Accordingly, a quality of a welding operation on the joint 30 may be improved. Moreover, the rotatable temperature sensing device 32 may be used in any application in which a temperature of a rotating device is to be detected. For example, the rotatable temperature sensing device 32 may be used in welding applications, cutting applications, grinding applications, induction heating applications, testing applications, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A temperature sensing device comprising:
   a first end configured to contact a workpiece on an outer surface of the first end;
   a second end configured to be mechanically coupled a stationary shaft;
   a rotatable shaft coupling the first end and the second end, wherein the rotatable shaft is configured to rotate the first and second ends together during operation, and wherein an angle of the rotatable shaft relative to the stationary shaft is adjustable; and
   a temperature sensor disposed in the first end and configured to communicatively connect to an external device, wherein the temperature sensor is configured to provide an indication of a temperature of the workpiece.

2. The temperature sensing device of claim 1, wherein the first end comprises a conical shape having a cone angle of approximately 90 degrees.

3. The temperature sensing device of claim 1, wherein the first end comprises a thermally conductive layer.

4. The temperature sensing device of claim 3, wherein the temperature sensor is configured to detect a temperature of the thermally conductive layer.

5. The temperature sensing device of claim 3, wherein the first end comprises a ceramic material having the thermally conductive layer.

6. The temperature sensing device of claim 1, comprising a slip ring, wherein the slip ring mechanically couples the second end to the stationary shaft.

7. The temperature sensing device of claim 1, wherein the second end comprises a rotatable electrically conductive contact comprising brushes, liquid metal, or some combination thereof.

8. The temperature sensing device of claim 1, wherein the temperature sensor comprises a thermocouple, a bimetallic sensor, or a combination thereof.

9. The temperature sensing device of claim 1, comprising the stationary shaft mechanically coupled to the second end, wherein the stationary shaft is communicatively coupled to the external device.

10. The temperature sensing device of claim 9, comprising a slip ring, disposed on the stationary shaft.

11. The temperature sensing device of claim 9, wherein the stationary shaft comprises one or more electrical contacts configured to contact a rotatable electrically conductive contact.

12. The temperature sensing device of claim 9, comprising a second stationary shaft, wherein the stationary shaft extends at an adjustable angle relative to the second stationary shaft.

13. The temperature sensing device of claim 12, wherein the external device comprises a power supply, and the power supply is configured to provide a visual indication, an audio indication, or a combination thereof, of the temperature of the workpiece.

14. The temperature sensing device of claim 1, comprising a wireless transmitter disposed in a rotatable tip and configured to wirelessly transmit data from the temperature sensor.

15. A temperature sensing device comprising:
a rotatable tip formed from an insulating material, wherein the rotatable tip is configured to contact a workpiece;
a thermally conductive layer coupled to the insulating material;
a temperature sensor configured to detect a temperature of the thermally conductive layer, wherein the temperature sensor is configured to communicatively couple to an external device; and
a stationary shaft mechanically coupled to the rotatable tip via a slip ring, wherein the stationary shaft is electrically coupled to the temperature sensor, and wherein an angle of the rotatable tip relative to the stationary shaft is adjustable.

16. The temperature sensing device of claim 15, wherein the rotatable tip comprises a conical shape.

* * * * *